(12) United States Patent
Lyubynskyy

(10) Patent No.: US 11,244,383 B2
(45) Date of Patent: Feb. 8, 2022

(54) SYSTEMS AND METHODS FOR MANAGING RENTAL RESERVATIONS WITH BLOCKCHAIN

(71) Applicant: Rentberry, Inc., San Francisco, CA (US)

(72) Inventor: Oleksiy Lyubynskyy, San Francisco, CA (US)

(*) Notice: Subject to any disclaimer, the term of this patent is extended or adjusted under 35 U.S.C. 154(b) by 346 days.

(21) Appl. No.: 16/288,056

(22) Filed: Feb. 27, 2019

(65) Prior Publication Data

US 2020/0273094 A1 Aug. 27, 2020

(51) Int. Cl.
*G06Q 30/06* (2012.01)
*H04L 9/06* (2006.01)

(52) U.S. Cl.
CPC ....... *G06Q 30/0645* (2013.01); *H04L 9/0637* (2013.01); *G06Q 2220/00* (2013.01); *H04L 2209/38* (2013.01)

(58) Field of Classification Search
CPC ............ G06Q 30/0645; G06Q 2220/00; H04L 9/0637; H04L 2209/38; H04L 2209/56; H04L 9/3239
See application file for complete search history.

(56) References Cited

U.S. PATENT DOCUMENTS

| | | | | |
|---|---|---|---|---|
| 2008/0265799 A1* | 10/2008 | Sibert | ................. | H05B 47/175 315/292 |
| 2010/0228618 A1* | 9/2010 | Mitchell | ............ | G06Q 30/0277 705/14.39 |
| 2014/0279173 A1* | 9/2014 | Georgiades | ........ | G06Q 30/0645 705/26.4 |
| 2018/0191714 A1* | 7/2018 | Jentzsch | ................ | G06F 21/445 |
| 2019/0108580 A1* | 4/2019 | Spivack | ............... | G06Q 50/163 |
| 2020/0193168 A1* | 6/2020 | Zhao | ..................... | H04L 9/3239 |
| 2020/0286194 A1* | 9/2020 | Li | ........................ | G06Q 50/163 |

\* cited by examiner

*Primary Examiner* — Johann Y Choo
(74) *Attorney, Agent, or Firm* — Redbrick IP, P.C.

(57) ABSTRACT

Systems and methods discussed herein are related to a rental ecosystem that implements cryptographically linked blockchain technology to provide a less costly, more convenient, and more secure rental process. A transparent ecosystem is described that verifies information about renters and landlords, thereby fostering trust between parties to a rental agreement. Auctioning technology is also described that reduces traditional frustrations, scam rates, time delays, and friction points in the rental process to benefit both tenants and landlords. Further, ecosystems described within this application offer the ability for community members to assist quality tenants by funding rental costs, potentially unfreezing millions of dollars tied up in rental deposits in the process.

20 Claims, 13 Drawing Sheets

1. Your Offer  2. Additional Info

Applicant With Highest Offer

| | |
|---|---|
| Rent Offer | $2,200 |
| Deposit Offer | $3,000 |
| Credit Score | 780 |
| Monthly Salary | $6,500 |
| Pets | 🐶 🐱 |
| Roommates | 👤👤 |

Asking Price: $2,000
Highest Offer: $2,000

Asking Deposit: $3,000
Highest Offer: $3,000

Monthly Rent
$2,000

Deposit
$3,000

Rental Property Information

Medium Demand
6 Applications

679
Average Credit Score

Show Details

Next 300
310
320
330
340

SYSTEMS AND METHODS FOR MANAGING RENTAL RESERVATIONS WITH BLOCKCHAIN

BACKGROUND

Despite many industries being successfully disrupted in recent years (e.g., retail, transportation, etc.), the long-term rental property space remains mired in tradition and lacks comparable innovation. The process of renting long-term often results in frustration and lost time for both the owners of rental properties who are looking for additional income and potential tenants who are looking for a place to live. To date, there has not been a technological disruption significant enough to usher in a new and better way to rent.

Around the globe, long-term rental practices include placing classified ads in print publications, or on sites such as Craigslist™, Zillow™, Rightmove™, and Zoopla™. Often, these sites and services provide limited information about a particular property for prospective tenants, and rarely provide support for actionable items, such as the application process, contract execution, rent collection, and maintenance requests. Currently, these tasks are performed manually.

Further, agents and brokers may charge significant fees for minimal services, and landlords may force tenants to freeze thousands of dollars in security deposits (also referred to as "rental deposits", or "deposits"). International renters face additional hurdles when attempting to rent because their credit scores and credit histories may only be valid in their country of citizenship, or in a country in which they are legally qualified to live.

Accordingly, there is a need for systems and methods that provide landlords and tenants with the opportunity to enjoy a transparent and universally acceptable platform for long-term rentals.

SUMMARY

Embodiments provide technical solutions to the aforementioned and other technical problems. In general, in one embodiment, a method is described wherein a system receives tenant information, landlord information, and rental property information from one or more cryptographically linked blockchains. An application for a rental property is received from a client device including information such as how much a tenant is offering to pay per month, how much the tenant is offering to pay as a security deposit, what the tenant's credit score is, etc. Another user of the system, who may be described as a "community member," may provide their information to the system as well, and offer to fund at least a portion of the rent and/or security deposit. This funding offer is then provided to the tenant and/or landlord, and upon acceptance by the tenant and/or landlord, a contract may be created.

In general, in one aspect, embodiments relate to a system for managing rental reservations with blockchain technology. In some embodiments, a system including one or more computers receive information about a tenant which is stored on a blockchain. The system also receives rental property information, and landlord information. In addition, the system receives a rental application from a tenant, which includes various rental terms. The system may provide the application to community members, who submit an offer to assist a tenant with paying for the rental property. The system provides the information to the tenant, who then can accept the terms.

In general, in one aspect, embodiments relate to a non-transitory computer-readable storage medium including a set of instructions for a crowdsourced rental deposit network. The instructions enable one or more computers to receive tenant information, rental property information, and landlord information from a blockchain. The one or more computers may also receive an application from a tenant, and an offer to assist with funding the security deposit for the rental from a community member. If the tenant accepts the offer from the community member, an agreement may be created between the community member, the tenant, and the landlord.

Other aspects of the invention will be apparent from the following description and the appended claims.

BRIEF DESCRIPTION OF THE DRAWINGS

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

Embodiments of the present invention are illustrated by way of example, and not by way of limitation, in the figures of the accompanying drawings and in which like reference numerals refer to similar elements.

FIGS. 2-8 illustrate exemplary depictions of a systems described herein, in accordance with one or more embodiments of the invention.

DETAILED DESCRIPTION OF THE INVENTION

Figure 1:
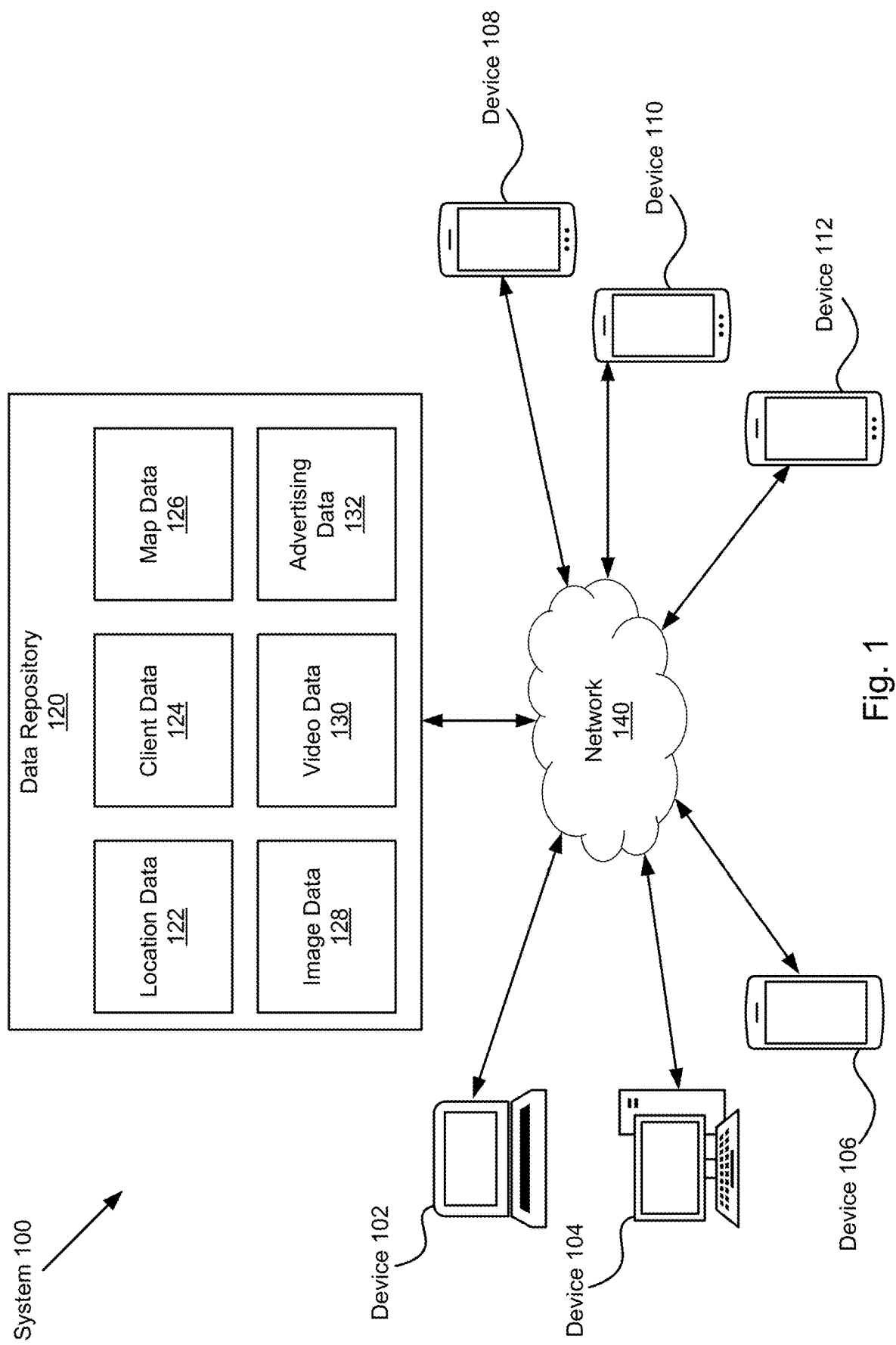
FIG. 1 illustrates a schematic diagram of a system, in accordance with one or more embodiments of the invention.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Various embodiments of the inventions described herein provide for a rental ecosystem, also referred to as a rental platform, that uses blockchain technology to make the rental process less costly and more convenient and secure. A transparent ecosystem is described that verifies information about renters and landlords, thereby fostering trust between parties to a rental agreement. Auctioning technology is described herein that reduces traditional frustrations, scam rates, time delays, and friction points in the rental process to benefit both tenants and landlords. In part, this is because the auctioning process and/or data associated with the auctioning process may be stored in a blockchain, thereby accessibly and reliably stored to provide a transparent process. Further, rental ecosystems described herein offer the ability for community members to assist quality tenants, thereby unfreezing millions of dollars tied up in rental deposits in the process.

In one or more embodiments described herein, a process is described that uses blockchain technology to streamline the long-term rental process by allowing tenants and landlords to complete at least a portion of the tasks associated with renting on a single system transparently. Tasks associated with renting may include, but are not limited to: searching for properties; making offers (e.g., using an auctioning system); screening tenants; selecting tenants (e.g., at least in part based on a score associated with a tenant); negotiating terms of a rental agreement; unlocking rental deposits; electronically signing contracts; paying at least a portion of one or more deposits and/or rent; submitting maintenance requests; hiring third-party service providers (e.g., handymen or plumbers), and enabling landlords to communicate with tenants. In one or more embodiments, systems described herein are decentralized and/or automate at least a portion of the tasks described herein using blockchain technology, which permanently and transparently records at least portions of the rental process (e.g., auctions).

In one or more embodiments, tenants have access to view rental listings on a rental platform. A rental platform may be a service, which may run on one or more systems. Landlords may also have access to the rental platform and be allowed to post listings. Also, community members, which may or may not be tenants and/or landlords, may have access to view tenant information and/or rental application information on the rental platform. Herein, user information (e.g., tenant information, landlord information, and community member information) may be included in a user profile (e.g., a tenant profile, a landlord profile, a community member profile, or a combination thereof). This information may also be included on one or more blockchains and accessed by the rental platform.

In one or more embodiments described herein, a user may be classified as a tenant, landlord, and/or community member, or a particular type of tenant, landlord, and/or community member if their information meets one or more criteria. For example, a user may be classified as a tenant if they indicate that they are interested in viewing rental properties and/or renting a rental property. A user may be classified as a high-quality tenant or a low-quality tenant based at least in part on a quality score associated with the user (also referred to as a tenant quality score), their financial history, rental history, credit report(s), tax returns, their history of receiving their rental deposits back from a landlord at the end of a rental term, etc.

Similarly, in one or more embodiments, a user may be classified as a landlord if they indicate that they are interested in posting rental property listings. A user may be classified as a high-volume landlord, a low-volume landlord, a commercial landlord, a residential landlord, a high-quality landlord, and/or a low-quality landlord based at least in part on a quality score associated with the landlord (also referred to as a landlord quality score), an amount of properties listed by the user, a type of one or more properties listed by the user, a condition of one or more of the user's rental properties, an amount of rent and/or deposit associated with one or more of the user's rental properties, etc.

Further, in one or more embodiments, a user may be classified as a community member if they indicate that they are not interested in renting a rental property or listing a rental property (although, it is contemplated that a community member may also be a tenant and/or a landlord). A community member may be classified as a high-volume community member, a low-volume community member, a community member that supports international tenants, a community member that supports low-income tenants, a community member that supports military veterans, and so on based at least in part on a quality score associated with the community member (also referred to as a community member quality score), an amount of properties that the user has helped fund, a type of one or more properties that the user has helped fund, a type of tenant that the user has helped fund (e.g., an international tenant, a low-income tenant, a military veteran tenant), etc.

In one or more embodiments, users may be required to pay for access to various portions and features of a system. For example, a tenant may not be able to filter listings by a location unless a fee is paid, a landlord may not be able to post rental listings unless a fee is paid, and/or a community member may not be able to fund rental listings unless a fee is paid.

Since rental property arrangements are often fraught with duplicated efforts, protracted bureaucratic processes, and financial friction, in one or more embodiments, platforms described herein benefit parties to rental property arrangements in many ways, whether the party is a tenant, landlord, community member, or a combination thereof.

In one or more embodiments, a landlord may create a rental listing on a rental platform with an asking price (e.g., a desired rent and a desired deposit). As described herein, a landlord may be any user classified as at least a landlord. Additional attributes of a rental property may be added to a rental listing, such as the rental property's location, a condition of at least a portion of the rental property, a number of bedrooms included in the rental property, a number of pets allowed, whether smokers are allowed, etc.

In one or more embodiments, a token associated with one or more blockchains may be used with a rental platform. For example, a token may be referred to as a rental token, and may be associated with a blockchain and/or cryptocurrency associated with the rental platform. In some embodiments, landlords may spend rental tokens to promote rental listings on a rental platform. The cost of promoting rental listings on a rental platform may be based on an amount of rental tokens other landlords have offered to pay for promoting rental listings.

In one or more embodiments, rental applications may be collected through a rental platform. Rental applications may be submitted by tenants, and may include a price (e.g., an amount of rent and a deposit) that the tenant(s) desires to pay for a rental property. Rental applications may be collected in a user-friendly format via the rental platform. Landlords may be able to view rental applications submitted for one of their property listings, and accept or reject a rental application with a single click. In some embodiments, a rental auction, as described herein, may be implemented to ensure transparency and fair competition for and between users. Such an auction may also allow landlords to reduce vacancy rates by seamlessly addressing pricing during depressed market conditions, capitalize on hot market conditions by extracting the most value from their properties, and select tenants based on data points in addition to what the tenants are willing to pay.

In one or more embodiments, a score may be assigned to a user. For example, information may be provided to a rental platform that is used to create a tenant quality score, a landlord quality score, and/or a community user quality score (collectively referred to as user quality scores). These user quality scores may be stored on one or more blockchains. This functionality provides users with an additional amount of trust that is not currently available on today's rental platforms.

User quality information, and in some cases, information received from a third-party (e.g., credit reports, references, criminal history and tax returns), may be analyzed and/or processed by a rental platform. Such analysis and processing may determine information that is decentralized, more secure, and/or more intuitive than vertically-focused information such as an Experian credit report.

Moreover, since user quality scores are included in a user profile/associated with a user, they may be used internationally. In one or more embodiments, user quality scores must be stored on a blockchain to be able to be used in an international rental arrangement. Thus, in some embodiments, landlords may be able to use tenant application data and a tenant quality score to filter and/or choose a tenant with which the landlord would like to enter a rental agreement, community members may be able to use tenant application data and a tenant quality score to filter and/or select tenants they would like to fund, and tenants may use landlord quality scores in addition to other information (e.g., open-house visits) to select a rental property.

In one or more embodiments, rent collection may be made easier using rental platforms described herein. For example, rent may be paid by a tenant and/or a community member using rental tokens. Landlords may be able to collect rent as rental tokens seamlessly and securely, and may use those rental tokens for other services on a rental platform (or in some cases convert them to a non-cryptocurrency).

Other services offered on a rental platform may include, but are not limited to: paying for rental property promotion and marketing—which may cause a landlord's rental property to be featured at the top of a set of displayed search results; help quality tenants rent their rental property by funding a at least a portion of their payments (e.g., rent and/or a deposit); and hire third-party service providers via the rental platform such as house cleaners, handymen, plumbers, electricians, etc. It should be noted that, in one or more embodiments, in addition to tenants, landlords, and community members, a fourth category of user may exist that includes service providers and information associated therewith.

In one or more embodiments, rental platforms described herein assist tenants with their rental arrangements. Tenants may be able to cause a system to display filtered results with data associated with rental listings. For example, a tenant may cause a rental platform to filter information associated with a rental property, wherein the information (e.g., size, price, and amenities) is retrieved from one or more blockchains. In one or more embodiments, a rental platform may allow a tenant to schedule open-house visits so they may view rental properties and meet the landlords. Internal and secure communications included within a rental platform may allow tenants to contact landlords without bothering them with phone calls and/or emails.

In one or more embodiments, a transparent application process is provided by the rental platform. Currently, rental decision models are cumbersome. Incomplete or less than desired tenant applications may be denied or cause a higher deposit to be required so a landlord feels more secure. Rental platforms described herein may allow tenants to submit applications via the rental platform without the need to email sensitive information (e.g., because the sensitive information may be stored on one or more blockchains). In one or more embodiments, tenants may be able to analyze demand for property and relevant information in rental applications submitted by other tenants. Tenants may be able to customize offers based on real- or near-real-time information, thus increasing the probability of securing a rental property (which may be done using auctioning technology described herein).

Further, rental platforms described herein may allow for the negotiating of rental agreement terms (e.g., rent, a deposit amount, and a lease duration). All of this information, as well as information described elsewhere in this application, may be stored on one or more blockchains such that information (sensitive or otherwise) may be more secure than current solutions because the information is recorded to a distributed leger.

In one or more embodiments, community members may use their rental tokens to at least partially fund rental deposits and/or rent for one or more tenants. In exchange for at least partially funding a deposit and/or rent, a community member may receive rewards such as rental tokens. Such rewards may be based on factors such as an interest rate, and amount funded, a number of tenants funded, etc. By at least partially funding rental deposits and/or rent for tenants, community members and rental platforms described herein allow otherwise qualified tenants to rent rental properties which they might not otherwise be able to afford.

By providing a tenant with an opportunity to rent a rental property, community members thereby provide the tenant with the opportunity to improve their tenant quality score by building a better reputation with landlords and/or better credit/tenant financial information. Further, landlords may have access to a larger pool of qualified payers (e.g., community members in addition to tenants) to increase the probability that rent will be paid. Of course, it should be understood that, in one or more embodiments described herein, if a landlord determines that a deposit should not be returned (e.g., due to poor treatment of a rental property by a tenant), community members that provided funding to the tenant to rent the rental property may not receive their deposit back after the end of a rental period.

In one or more embodiments described herein, tenants, landlords, and/or community members may securely and safely execute rental agreements using a user's blockchain key and then store information associated with the rental agreements to one or more blockchains. Thus, such agreements may be executed quickly without wasting paper or time. Execution of agreements may lead to an automatic settlement (e.g., a transfer of rental tokens) pursuant to terms of the rental agreement, thereby reducing friction, time, and reconciliation issues associated with confirming and paying deposit and rental payments when using current rental platforms. In some embodiments, these agreements may be referred to as smart contracts, which will be discussed in greater detail below.

In one or more embodiments, tenants may be able to submit maintenance requests (e.g., to landlords) via a rental platform. Requests may be stored in a rental system and/or on one or more blockchains to be accessed at any time in case there is a future dispute. Tenants that record activity in a rental platform and one or more blockchains will thereby have more reliable proof indicating they reported rental property issues in a timely manner, thereby reducing potential liability for additional damage that a tenant may have (allegedly) failed to report promptly, or not reported at all.

In one or more embodiments, tenants' (and other users') information may be securely stored on one or more blockchains. This information may include a user's financial history, rental history, credit rating, references, and/or reviews. Thus, data may be owned and controlled by a user, and only made visible to another user (e.g., a landlord) when the user attempts to perform a task (e.g., submitting a rental application) using their private key/wallet via a mobile and/or web app accessing the rental platform.

In one or more embodiments, rental platforms described herein utilize auctioning technology, as briefly mentioned above. Auctioning may ensure that landlords price their properties optimally in both hot and cold markets, while tenants are afforded visibility on competing offers so they may negotiate rental property terms via the rental platform.

Auctioning may be implemented within a rental platform to supplement other rental platform components and allow a tenant to bid on a rental property, electronically sign rental agreements, and make payments (e.g., using rental tokens and/or a generic currency). For example, a rental application may cost a tenant 1,000 rental tokens to submit, of which 50 may be collected by the rental platform as a fee for service. The remaining 950 rental tokens may be provided to a landlord. These tokens may be used to pay for a credit report, and/or other information associated with a tenant which may be created based on information about the tenant stored on one or more blockchains. It is contemplated that in some embodiments, more than one type of cryptocurrency (and tokens associated therewith) may be used within a rental platform.

In one or more embodiments, the workflow of rental tokens may be driven by smart contracts. In other words, various tasks performed, such as the submission of a rental application, at a rental platform that includes the use of rental tokens may be stored on one or more blockchains. Smart contracts are generally information such as agreements and information associated therewith (such as a property, terms of a rental agreement, dates of execution, effective dates of agreements, prices, outcomes of an agreement that was executed or not executed and reasons associated therewith, etc.).

In some embodiments, a rental platform may employ artificial intelligence or machine learning to provide users with recommendations they are more likely to be interested in based at least on market conditions and/or information associated with the user.

In one or more embodiments, a crowdsourced rental deposit network is at least partially included in a rental platform. As described herein, rental platforms may provide tenants with the ability to unlock some or all of the money they would typically tie up in a rental deposit by using a crowdsourced rental deposit network. A crowdsourced rental deposit network may include community members, landlords, and/or other tenants that fund at least a portion of a rental properties price (e.g., a deposit and rent). Smart contracts may underpin crowdsourced rental deposit networks, by providing provenance and transparency to users regarding underlying assets (e.g., tenants) and providing for more efficient onboarding, lease transfer, and settlement processes than current solutions. For example, information about security deposits may be stored on one or more blockchains via a rental platform, and a user quality score may be associated with the security deposits. Users, such as landlords, may have access to the deposit funds provided by a tenant and/or community members in case there is damage to a rental property.

In one or more embodiments, after a certain amount of the funds are claimed by a landlord, the remaining funds may be provided to community members that funded a deposit (e.g., based on attributes of a community member and/or agreement such as how much the community member funded the deposit), and then funds may be returned to a tenant (or vice-versa). In some embodiments, funding may be returned to users in a pro-rated way such that more than one community member receives at least a portion of the amount they funded the price of the rental arrangement. When such a deposit is not returned, a tenant's quality score may be negatively affected.

Further landlords and community members involved in the rental arrangement may be able to rate a tenant and write a review that is associated with the tenant, which may impact the tents ability to crowdsource deposits in the future. It should be noted that users may rate other users and/or write reviews that are associated with other users at other times as well, other than when a tenant does something preventing at least a portion of a deposit to be returned by a landlord. Also, as with other interactions described herein, ratings and reviews may be stored on one or more blockchains, and thus may be included as at least part of a smart contract.

In one or more embodiments, a rental platform's crowdsourced deposit network may operate as follows. A tenant may be required to pay a percentage of a deposit (e.g., 10%). Community members may view information about a tenant, and submit offers (also referred to herein as applications, or funding applications, which may include funding amounts and/or terms) that may include what rewards the community member is seeking in return. For example, a community member may receive 5%-10% of the amount they funded a rental arrangement with at the end of the rental period. A tenant may receive information about the offer(s) from community members, and select one or more of the offers to assist with funding the rental arrangement. In one or more embodiments, a rental platform may collect additional funds from a tenant to ensure community members do not lose money on their investment (although they may not receive their desired rewards). Once a rental agreement is completed, and/or at the end of a rental period, a rental platform may collect a portion of (e.g., a percentage of) a transaction as a fee for services provided.

In one or more embodiments, rental platforms free up rental security deposits worldwide. As tenants change rental units, the security deposits they provide to landlords are frozen, or unusable by the tenant. Often, landlords may store security deposits in low-interest-rate bank accounts. Rental platforms described herein allow quality tenants to deposit less, thereby unlocking/unfreezing the money they would have put toward a deposit. Community members may benefit by receiving a return on their investment. Further, landlords may benefit by increasing the pool of applicants that finance part of a security deposit.

FIG. 1 illustrates an example schematic diagram of system 100, in accordance with one or more embodiments of the invention. System 100 may include devices 102, 104, 106, 108, 110, and 112 (e.g., electronic devices such as a computer, a smart phone, and/or a tablet). Devices 102, 104, and 106 may be devices belonging to a first user, which the first user may use to access system 100. Devices 108, 110, and 112 may be smart phones belonging to other users (e.g., not the first user, a connection, a non-connection). In some embodiments, devices 108, 110, and 112 may include a video camera at a location, an electronic assistant such as an Amazon Echo™, etc. Once a first user accesses system 100, the first user may be able to view a map of an area, locations, reviews of locations, locations of connections, locations of non-connections, etc. The various devices included in system 100 may be connected wirelessly via network 140.

FIG. 1 also includes example data repository 120. It should be understood that data repository 120 may include more, or less, data than shown in FIG. 1. Further, it should be understood that data repository 120 may be stored on a variety of devices such as a server, a multi-tenant environment (e.g., the cloud), etc.

Data repository 120 may include location data 122, client data 124, map data 126, image data 128, video data 130, and/or advertising data 132. Location data 122 may include data including, but not limited to: maps of various cities or areas, locations (also referred to as points of interest)—which may include night clubs and sporting events, the locations of connections, the locations of non-connections, and/or the location of a user.

Client data 124 may include information associated with clients, which may be defined as users or client devices, and include data such as, but not limited to: a current location of a client, previous locations of a client, and/or information about a client (e.g., music preference or activity preferences in the case of a user, or device type or operating system in the case of a client device).

Map data 126 may include information associated with a map, including, but not limited to: names of location, locations' coordinates, locations' addresses, data associated with transportation (e.g., directions, bus routes, available taxi services), connection information, and/or non-connection information.

Image data 128 may include image information which may include, but is not limited to: one or more images of the interior of one or more locations, one or more images of one or more users/connections/people/animals at one or more locations, one or more images of the area outside of one or more locations (e.g., a line outside of a night club), and/or one or more images not captured by a user (e.g., received by system 100 from the Internet).

Similarly, video data 130 may include, but is not limited to: one or more videos of the interior of one or more locations, one or more videos of one or more users/connections/people/animals at one or more locations, one or more videos of the area outside of one or more locations (e.g., a line outside of a night club), and/or one or more videos not captured by a user (e.g., received by system 100 from the Internet).

In some embodiments, data repository 120 may include advertising data 132, which may be shown on device 102, 104, 106, 108, 110, 112. This information may be shown on a map, or in some cases within a review to save screen real estate. The advertising data may include information including, but not limited to: a video, text, images, information associated with a location, information associated with a location where device 106, 108, 110, 112 is located or where it has previously been, and/or information associated with a location where a connection is located.

Figure 2:
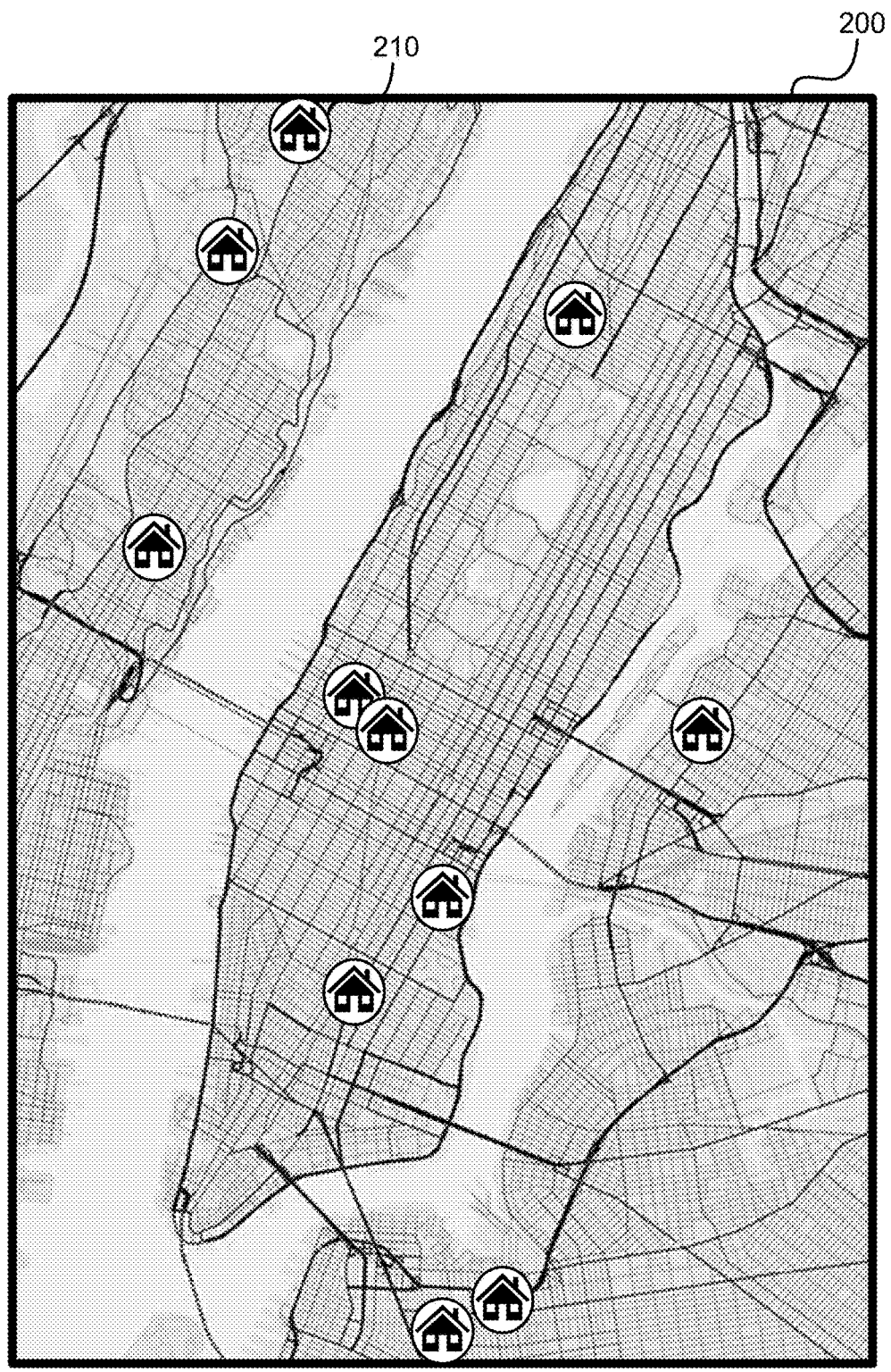

FIG. 2 illustrates an example depiction of a system described herein, in accordance with one or more embodiments of the inventions. FIG. 2 illustrates an example display 200 showing one or more icons 210 representing rental properties. Users of the system may access rental property information by clicking on a listing (which may also be referred to as a rental property profile). The listing may include rental property information such as when the listing was posted to the rental platform, how much the monthly payments are, and if the landlord wants a security deposit, how much the security deposit is.

FIG. 3 illustrates an example depiction of a system described herein, in accordance with one or more embodiments of the inventions. FIG. 3 illustrates an example user interface 300 provided by a rental platform. User interface 300 allows a tenant to submit an application to rent a rental property. In this example, a tenant may bid on a rental property using the rental platform's auctioning system. The tenant may see how much other applicants have bid, analyze demand for various properties, and in some cases additional information about the other applicants. For example, user interface 300 allows a tenant to view rental property information 330. Rental property information 330 may include how many applicants have applied to rent a property, the average credit score of other applicants, and so forth. User interface 300 also allows a user to view information about other applications. For example, application information 320 displays information about the application with the highest offer. It includes how much that application offered to pay in rent, how much that application offered to pay as a security deposit, an applicant's credit score, an applicant's monthly salary, how many and/or what types of pets the applicant has, and/or how many roommates will be living with the applicant. Of course, other information may be included, and application information 320 is only an example. As shown, in one or more embodiments, a tenant may customize their offers in real-time based on the demand of one or more rental properties, thus increasing the chances of securing the property using the auction technology described herein.

User interface 300 may also provide a tenant with the ability to submit their own application including how much they would like to pay monthly and how much they would like to provide for a security deposit. User interface 300 may include multiple pages, and may have navigational buttons such as the next page button 340.

Figure 4:
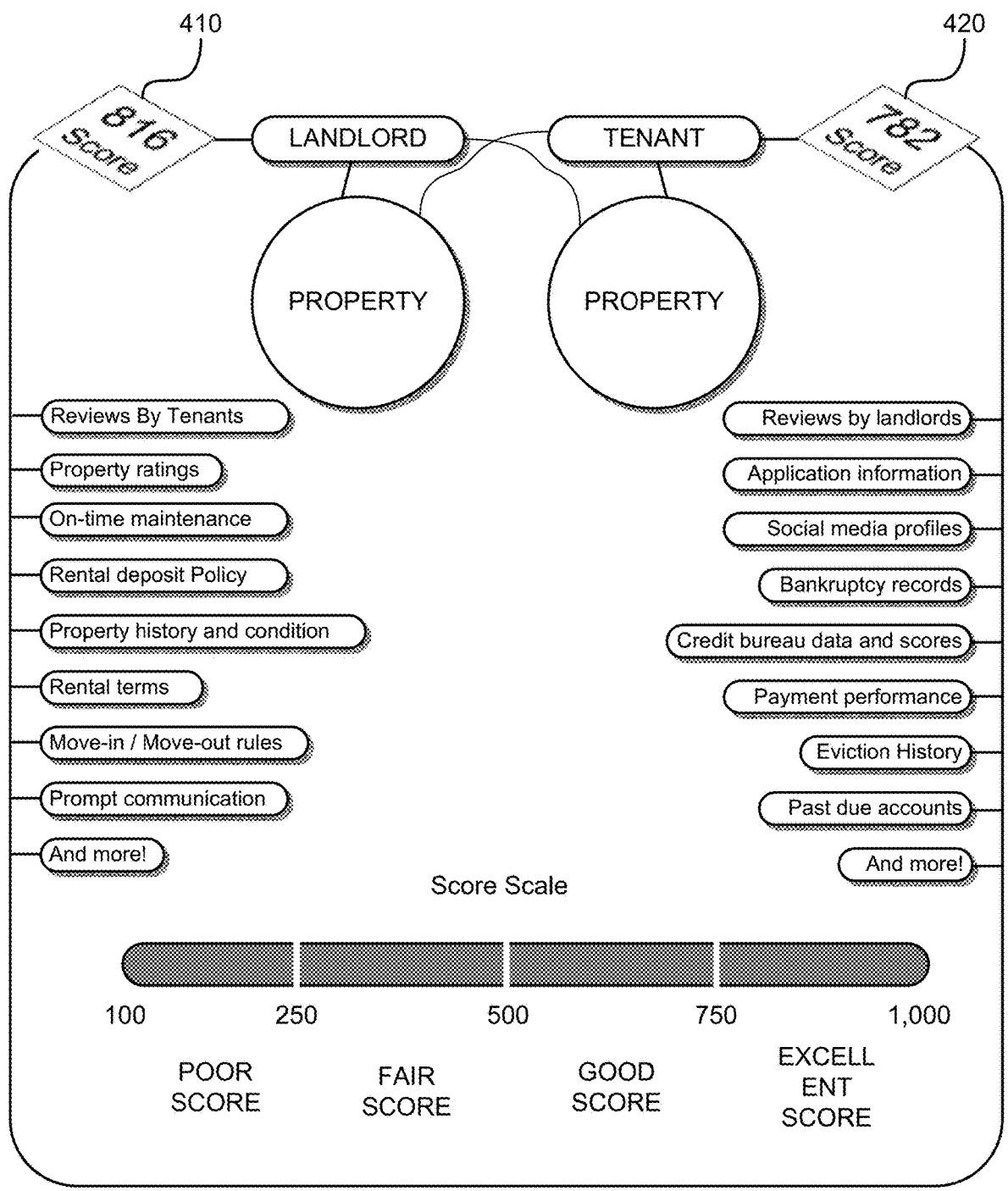

FIG. 4 illustrates and example depictions of a systems described herein, in accordance with one or more embodiments of the inventions. FIG. 4 illustrates a scoring system that may be used to determine a user's quality score. FIG. 4 includes a landlord quality score 410, which in this case is 816. This score is calculated based on factors (some of which are shown in FIG. 4) including, but not limited to: reviews by tenants, property ratings, on-time maintenance, rental deposit policies, property history and condition, rental terms, move-in/move-out rules, and responsiveness of communication. FIG. 4 also includes a tenant quality score 782. This score is calculated based on factors (some of which are shown in FIG. 4) including, but not limited to: reviews by landlords, application information, social media profiles, bankruptcy records, credit bureau data and scores, payment performance, eviction history, and past due accounts.

Figure 5:
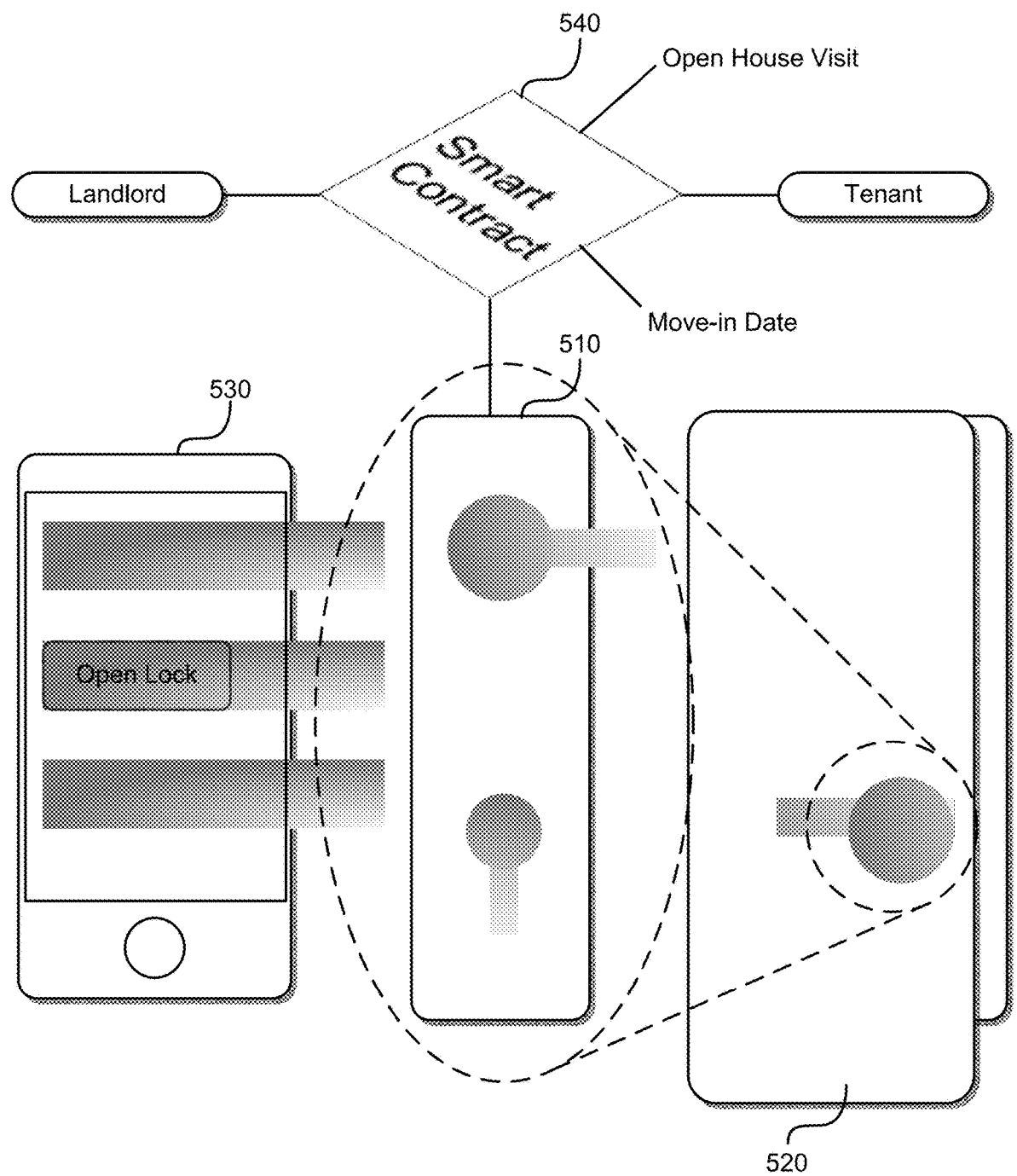

FIG. 5 illustrates and example depictions of a systems described herein, in accordance with one or more embodiments of the inventions. FIG. 5 illustrates example smart lock technology that may assist landlords hold open houses and tenants with viewing rental properties. FIG. 5 includes a smart lock 410, which is a larger version of the smart lock shown on door 420. FIG. 5 also includes an electronic device 430, and smart contract 440. With smart locks, a landlord need not be present to let a potential tenant into a property. (It should be noted, that for the ease of reading, potential tenants and tenants are used interchangeably throughout this instant disclosure). A potential tenant may use an identity verification solution (e.g., Civic Technologies™) via an electronic device such as a smart phone to open a lock. Smart locks 410 may be charged using power from electronic device 430 (or via other methods such as solar power). In one or more embodiments, smart contract 440 may be an agreement entered into by a landlord and a potential tenant that is stored on one or more blockchains. In response to smart contract 440 containing various information (e.g., a statement that allows a user to open a particular lock or a lock at a particular property), the smart contract may cause the electronic device 430 to be able to open smart lock 410. For example, a tenant profile may include the locks which it can open. As another example, the rental platform may include a mobile application that requests data from a server that allows electronic device 430 to open smart lock 410.

Figure 6:
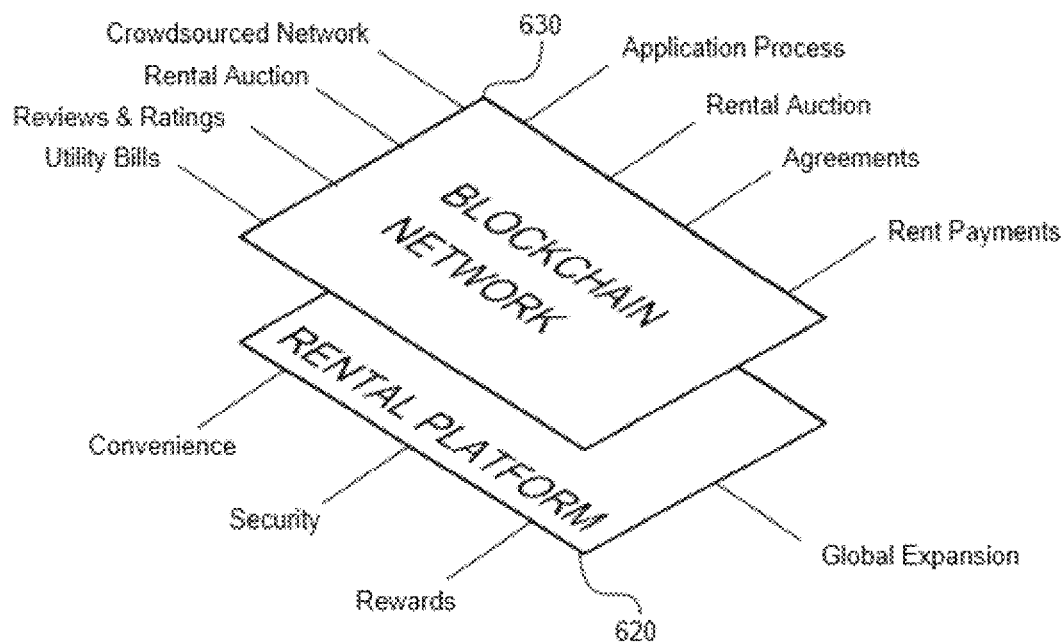

FIG. 6 illustrates example depictions of a systems described herein, in accordance with one or more embodiments of the inventions. FIG. 6 provides a visual representation of an example smart contract. FIG. 6 includes a visual representation of the blockchain network 630 and the rental platform 620. Combined, the technology provides for securing and transferring funds, and supporting complex multi-party agreements as described herein. This way, data such as tenant information, rental property information, landlord information, contracts, credit scores, lease duration, etc. is saved in an immutable distributed data store that users knew cannot be tampered with. Payment flows can be optimized, identity can be managed securely, and the overall rental experience can be improved. In one or more embodiments, users of the system may have a wallet to validate their identity on the platform. Such a wallet may be digital and allow users to store cryptocurrency as well as authenticate themselves.

Figure 7:
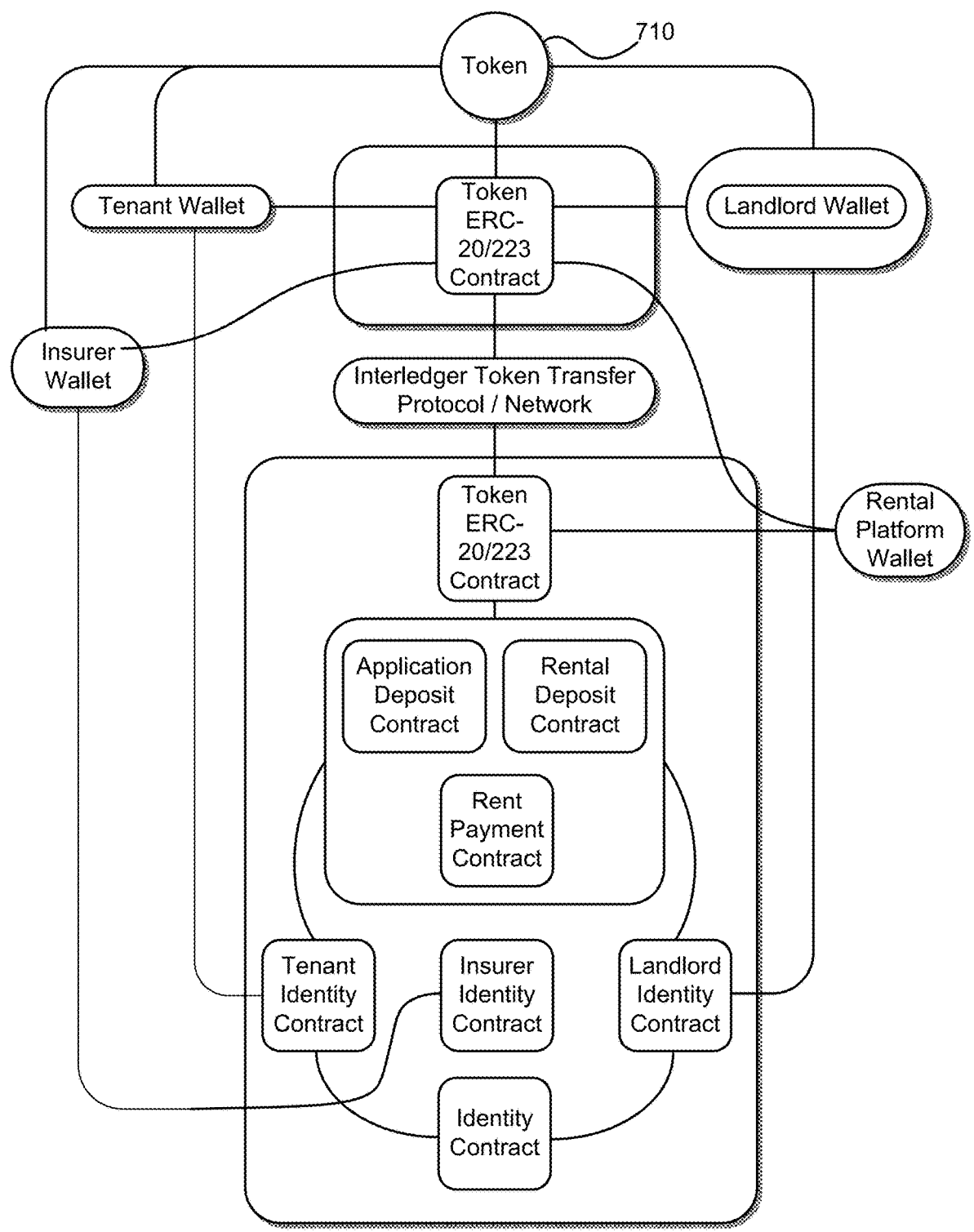

FIG. 7 illustrates example depictions of a systems described herein, in accordance with one or more embodiments of the inventions. FIG. 7 provides an example visual representation of how rental tokens are used by rental platforms. FIG. 7 includes a visual representation of a token 410. In one or more embodiments, a rental token may be issued on the Ethereum blockchain under one or more of the ERC-20 and ERC-223 token standards. Smart contracts may be written in Ethereum Solidity. Of course, in some embodiments a rental platform may be agnostic to the type of token standards used. In one or more embodiments, the rental platform may use a hybrid public/private blockchain model. In such an embodiment, while rental tokens would reside on the public chain, a private blockchain network leger, with smart contract capability, may be used to track all transactions on the rental platform. Interchain token transfer, in one or more embodiments, may be provided by a trustless standard inter-ledge protocol. In one or more embodiments, only rental platform users may have access to the private chain ledger.

In some embodiments, a rental process may occur as follows: (1) tenants purchase rental tokens to be stored in their personal wallets; (2) tenants apply to rent an apartment, allocating 1,000 rental tokens to an Application Deposit Smart Contract (e.g., an application fee); (3) a landlord selects a preferred tenant, and 950 rental tokens are moved from the Application Deposit Smart Contract to the of the tenant to a Rental Deposit Smart Contract serving as an initial down payment toward the rental deposit (while the remaining 50 tokens may be transferred to the operator of the rental platform as a fee); (4) a tenant may then seek contributions (e.g., funding) from community members toward the required rental deposit; (5) the rental platform provides community members with the tenants request; (6) community members make offers (e.g., submit a funding application) to pay the tenant's rental deposit, and in some cases a reward that the community member desired; (7) a tenant selects a community member's offer (also referred to as a funding application); (8) community members transfer rental tokens to the tenant's Rental Deposit Smart Contract; (9) the tenant transfers the rental tokens to the Rental Deposit Smart contract equal to the tenant's minimum contribution (which may include the amount for the reward for the community member); (10) the Rental Deposit Smart Contract may automatically distribute a fee to the rental platform's operator; (11) when the tenant moves out of the rental property, if there has not been a damage claim made by the landlord, the Rental Deposit Smart Contract will cause the transfer of rental tokens that have been deposited back to the tenant and each community member (plus any agreed upon reward); (12) when the tenant moves out of the rental property, if there has been a damage claim made by the landlord, the Rental Deposit Smart Contract may cause the transfer of rental tokens to the landlord's wallet equal to the value of the claim (the remaining tokens may be paid back to the community member and tenant, either: pro rata; to the community member and if there are any tokens left to the tenant; to the tenant and if there are any tokens left to the community member; etc.).

Figure 8:
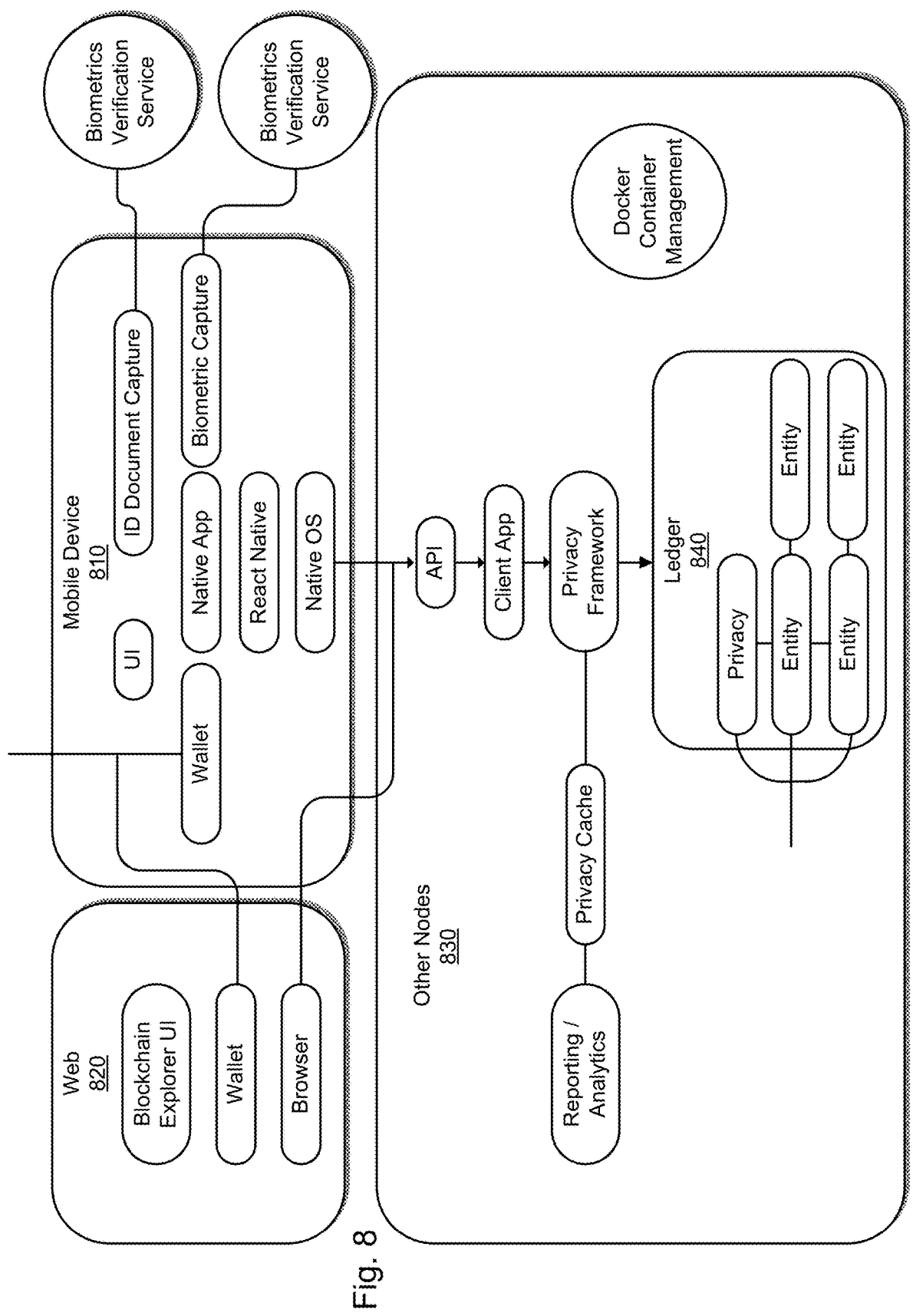

FIG. 8 further illustrates example depictions of systems described herein, in accordance with one or more embodiments of the inventions. FIG. 8 provides an example visual representation of how a rental platform may be configured. FIG. 8 includes a mobile device 810, the Web 820, and other nodes 830 which include at least one ledger 840. In one or more embodiments, the Web 820 includes a blockchain explorer user interface, a wallet, and a browser. Mobile Device 810 may include modules that verify a user's identity. Other nodes 830, which may be part of a multi-tenant environment (e.g., the cloud) may include an interface to the rental platform, and a ledger 840 that can record transactions between multiple parties in an efficient, verifiable, and permanent way.

Figure 9A:
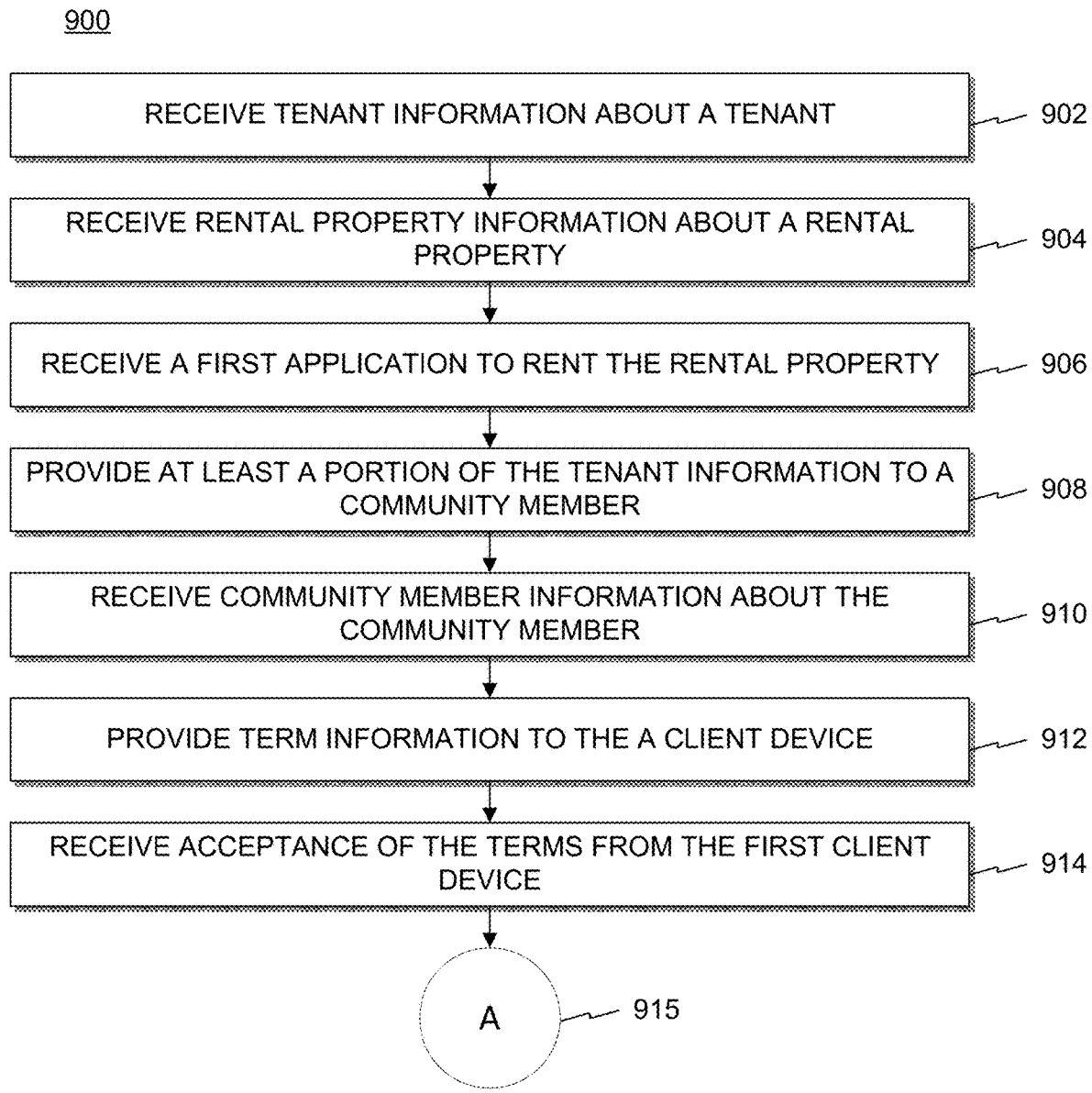
FIGS. 9A-9C illustrate flowcharts of exemplary processes, in accordance with one or more embodiments of the invention.
Figure 9B:
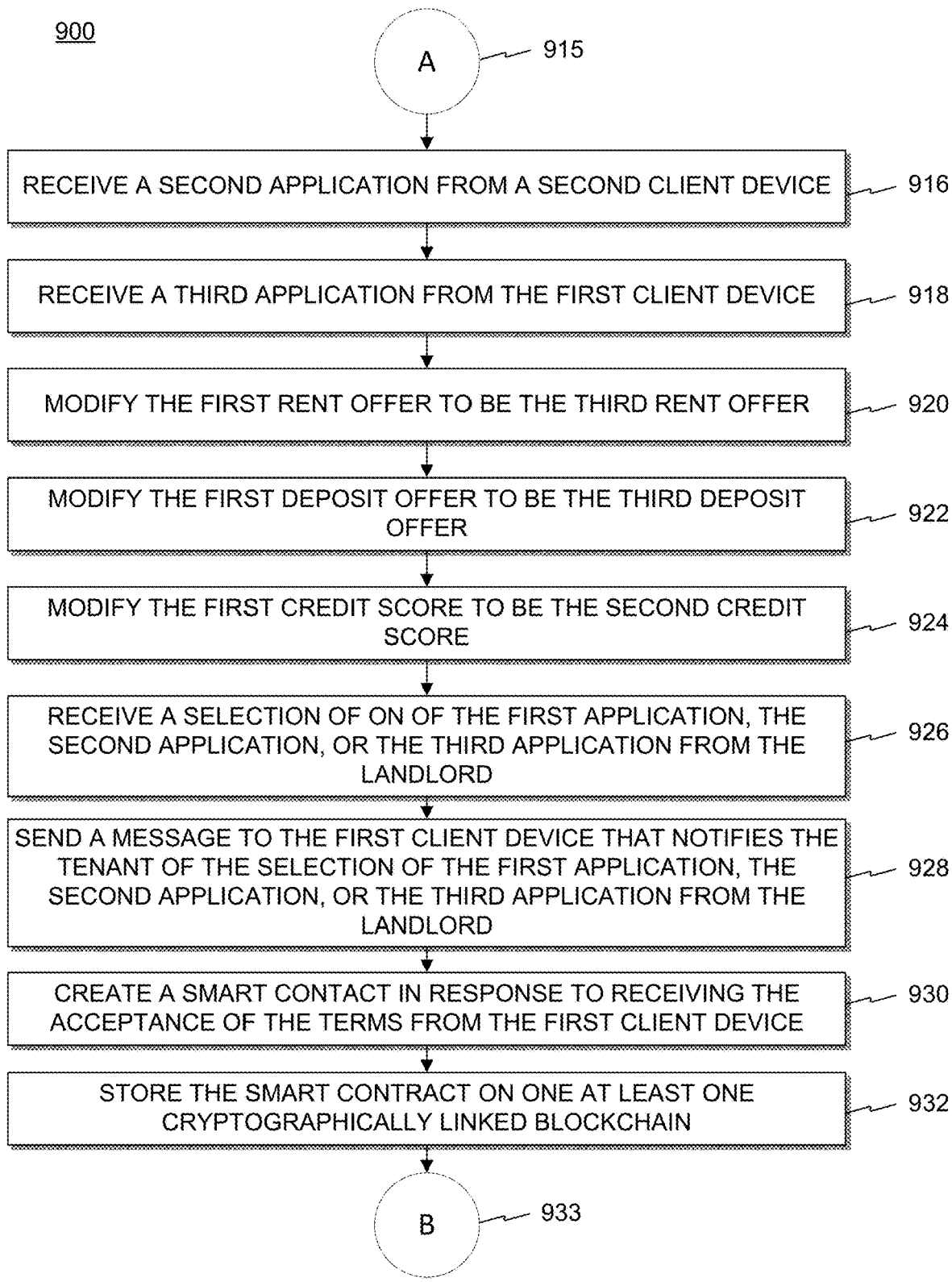
Figure 9C:
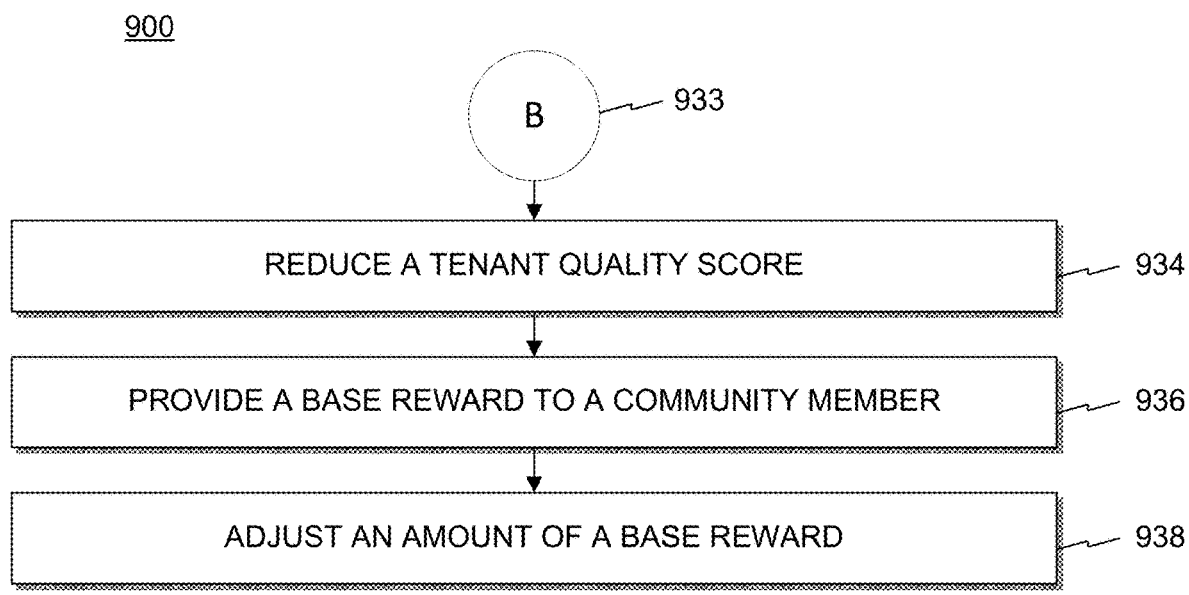

FIGS. 9A-9C show a flowchart 900 of a method for crowdsourcing through one or more cryptographically linked blockchains, in accordance with one or more embodiments of the invention. A cryptographically linked blockchain generally refers to a blockchain that implements some type of encryption. While the various steps in the flowchart are presented and described sequentially, one of ordinary skill will appreciate that some or all of the steps can be executed in different orders and some or all of the steps can be executed in parallel. Further, in one or more embodiments of the invention, one or more of the steps can be omitted, repeated, and/or performed in a different order. Accordingly, the specific arrangement of steps shown in FIGS. 9A-9C should not be construed as limiting the scope of the invention. In one or more embodiments, the steps of FIGS. 9A-9C can be performed by the cloud or a server (which may include data repository 120, and/or systems 1000 and/or 1100).

In STEP 902, tenant information about a tenant is received from a first client device. This information may be received at a multi-tenant environment (e.g., the cloud) from a device such as a smart phone. Tenant information may include information including, but not limited to: a tenant's age, occupation, sex, marital status, credit score, work history, desired lease duration, desired monthly rent payments, a desired security deposit amount from the tenant and/or a desired security deposit amount from a community member, the tenant's previous interactions with the rental platform, etc. In one or more embodiments, tenant information may be stored on one or more cryptographically linked block chains.

In STEP 904, rental property information about a rental property is received. Rental property information may include landlord information (e.g., information about the landlord of, and/or associated with, the rental property), and other information such as the rental property's location, address, size, number of rooms, number of bathrooms, size of plot of land, amenities, garage attributes, cost, whether utilities are included in the price of the rental of the rental property, whether pets are allowed, etc. In one or more embodiments, the rental property information and the landlord information are at least partially stored on the one or more cryptographically linked blockchains. In one or more embodiments, a tenant and/or community member may filter results based on rental property information and/or landlord information. For example, a tenant and/or community member may filter results based at least in part on landlord information such as: (1) a landlord's history of returning security deposits to a tenant and/or community member, and/or (2) a probability of a landlord returning security deposits to a tenant and/or community member.

In STEP 906, a first application to rent the rental property is received. A rental application may include a rent offer (e.g., a monthly payment amount for the rental property), a security deposit offer, a credit score, references, rental history information, a tenant quality score, etc. The first application to rent the rental property may be received from the tenant and/or a first client device (e.g., an electronic device used by the tenant). This application may include a rent offer (e.g., an offer including how much the tenant would like to pay per month), a security deposit offer (e.g., an offer including how much the tenant would like to pay as a deposit), and/or a credit score (e.g., the tenant's credit score and/or the credit score of one or more other people such as a potential roommate of the tenant).

In STEP 908, at least a portion of the tenant information may be provided to a community member. As discussed herein, one or more community members may assist a tenant in paying for a deposit and/or one or more monthly rental payments. For example, a tenant may submit an application, with or without knowing how much one or more community members will provide to help cover the deposit amount. In one or more embodiments, as described herein, a community member may pay at least a portion of the security deposit and/or monthly rental payments in one or more types of tokens associated with one or more blockchains. Further, a community member may receive a reward for contributing to a security deposit and/or monthly rental payments. Such a reward may be based at least in part on tenant information such as their credit score and/or quality score.

In STEP 910, community member information about the community member may be received. For example, this information may include the community member's occupation, age, sex, credit score, community member score, etc. This information may also include whether the community member is an accredited investor, as defined by the U.S. Securities and Exchange Commission (the "SEC"). In one or more embodiments, community member information may include term information (e.g., information about terms) for funding at least a portion of one or more rental properties. Such terms may be provided by the community member to the rental platform. In one or more embodiments, multiple community members may form a syndicate and/or fund at least a portion of one or more applications to rent a rental property together. Also, in one or more embodiments, one or more types of tokens may be used to pay/fund rental properties in the system, which may be associated with one or more blockchains.

In STEP 912, term information may be provided to a first client device. In one or more embodiments, the first client device may be a device owned or used by a tenant. As an example, the term information may allow the tenant to make an informed decision about whether or not to accept the terms offered by one or more community members. In one or more embodiments, term information may include information associated with a rental agreement between a tenant, landlord, and/or community member, such as at least a portion of an amount of a deposit for the rental property.

In STEP 914, an acceptance of terms may be received from the first client device. For example, a system may receive an acceptance of terms provided by one or more community members and/or a landlord. These terms may include the price of monthly payments, a security deposit amount, and other information described throughout the present application. In one or more embodiments, an acceptance of terms may cause a smart contract to be created by the rental platform.

In STEP 915, the method continues to step 916, located in FIG. 9B.

In STEP 916, a second application may be received by a second client device. This second application may be received by a system (e.g., which may be included in a multi-tenant environment), and/or be transmitted to one or more landlords and/or community members. For example, after a landlord receives a first application from a tenant, the landlord may receive a second application form a different tenant. As described herein, in one or more embodiments the term "tenant" may refer to a "potential tenant", which should be understood by someone skilled in the art.

In one or more embodiments, systems described herein may be similar to an auction. For example, in some embodiments, the application from the tenant may include a first rent offer, a first deposit offer, and/or a first credit score. A second application may be received from a different tenant, which may include a second rent offer, a second deposit offer, and/or a second credit score. In one or more embodiments, the second rent offer may be higher/more preferable than the first rent offer, the second deposit offer may be higher/more preferable than the first deposit offer, and/or the second credit score may be higher/more preferable than the first credit score. In such a case, for example, a landlord and/or community member may select the second application (and therefore the second tenant) as the "winning" application. Although, in one or more embodiments a landlord and/or a community member may nevertheless select the first application for a variety of reasons, such as whether the first tenant has pets.

In STEP 918, a third application may be received from the first tenant (who may use or own the first client device). The third application may include a third rent offer, a third deposit offer, and/or a third credit score. In one or more embodiments, the third rent offer may be higher than the second rent offer, the third deposit offer may be higher than the second deposit offer, and/or the third credit score may be higher than the second credit score. In such a case, for example, a landlord and/or community member may select the third application (and therefore the first tenant) as the "winning" application. In one or more embodiments, in response to a landlord and/or community member selecting an application, a smart contract may be created by the rental platform.

As can be seen in at least steps 920, 922, and 924, a system may operate like an auction. For example, a first tenant may make a first bid (e.g., the first application), a second tenant may make a second bid (e.g., the second application), and the first tenant may make a third bid (e.g., the third application)—usually made if the second bid is more preferable to the first bid. For example, a more preferable bid may be a bid that includes a higher rental payment, a higher security deposit, and/or a higher credit score. A more preferable bid may be based on other information, such as whether the tenant has or doesn't have pets.

In one or more embodiments, more than two tenants may bid (e.g., submit applications) for a rental property. Further, in one or more embodiments, there may be a limit on how many times a particular tenant may bid on a rental property. That limit may be based on how much funding one or more community members are willing to provide (e.g., toward at least a portion of a tenant's rent and/or security deposit).

In one or more embodiments the third application is based at least in part on the first application. In STEP 920 a modification is made to the first rent offer such that it is the third rent offer. In STEP 922 a modification is made to the first deposit offer such that it is the third deposit offer. In STEP 924 a modification is made to the first credit score such that it is the third credit score. For example, rather than submit a completely new application, in one or more embodiments a tenant may modify the first application so that it is, in effect, a third application. For example, a tenant may modify one or more of a rent offer (e.g., a monthly rent payment, a yearly rent payment), a security deposit offer, and/or a credit score to effectively create a new application, while they leave their other information the same as in the first application (e.g., their phone number, their name, their current address, their occupation, etc.).

In STEP 926, a selection of one of the first application, the second application or the third application is received from the landlord. For example, the landlord may decide that they would like to enter into an agreement based on one of the three applications (e.g., the landlord may select the "winner" of the "auction"). In some embodiments, a system may automatically select a winner of an auction based on their bids and/or additional information (which may be provided by one or more landlords and/or community members).

In STEP 928, a message is sent to the first client device that notifies a tenant of the selection of one of the three (or more) applications. This message may notify the tenant that the landlord has accepted their application (or one of their applications), it may notify the tenant that the landlord has rejected their application (or one of their applications), it may notify the tenant that their application has been selected to move forward based on criteria (e.g., whether the tenant accepts a counter offer).

In STEP 930, a smart contract may be created in response to receiving an acceptance of terms from a first client device. In one or more embodiments, the terms may be included in term information, and may be provided to a system by one or more landlords and/or community members. In one or more embodiments, a smart contract may include tenant information, rental property information, and/or term information. In one or more embodiments, such information may be stored on one or more cryptographically linked blockchains.

In STEP 932, a smart contract may be stored on the one or more cryptographically linked blockchains. For example, as shown in FIG. 6. Smart contracts may underpin the transaction process, by providing provenance and transparency to tenants, landlords, and community members. Smart contracts may also render a more efficient transfer and settlement process (e.g., of agreements and/or disputes). In one or more embodiments, a smart contract is an agreement between one or more parties stored on one or more blockchains.

As described above, it should be understood that, in some embodiments various steps may be performed in one or more orders, be included in a method and/or process, and/or not be included in a method and/or process.

In STEP 933, the method continues to step 934, located in FIG. 9C.

In STEP 934, a tenant quality score is reduced. In one or more embodiments, a tenant quality score may be included in tenant information. A tenant quality score may indicate the probability that a tenant takes care of a rental property (e.g., not damage the rental property), such that a landlord will return a security deposit. In one or more embodiments, a tenant score may be reduced in response to a security deposit for a rental property not being returned by a landlord to at least a tenant and/or a community member. The tenant score may be based on previous rental history, which may include rentals arranged through the rental platform and/or outside of the rental platform. In various embodiments, this information may be stored on one or more blockchains.

In STEP 936, a base reward may be provided to a community member. In one or more embodiments, a base reward may be a percentage of an amount of funding deposited by a community member, and/or that amount of funding may be included in term information. For example, a community member may provide $1,000 toward a deposit, and if the deposit is returned (e.g., based on how well a tenant took care of the rental property), the community member may receive $1,100. In such an example, an APR may be 10% (e.g., if the rental duration was a year).

In STEP 938, a base reward may be adjusted. In one or more embodiments, a base reward (e.g., an amount of money, a percentage of a deposit), may be adjusted based on a tenant quality score. For example, in some embodiments, a community member may receive more, or less, based upon an amount of risk taken. An amount of risk may be represented by a tenant quality score. For example, in one or more embodiments, a community member may receive a base reward for funding a deposit (e.g., at 10% APR), but may receive an additional amount (e.g., another 5% APR) if the application the community member is helping fund is submitted by a tenant with a low tenant quality score. As described above, a tenant quality score may be based on many factors, which may include whether a previous landlord has returned a tenant's deposit (e.g., because the tenant did not harm the rental property). In one or more embodiments, a tenant's rental score may be included in the tenant information, and may be reduced in response to a deposit for a rental property not being returned by a landlord to the tenant (and/or a community member). In one or more embodiments, where a base reward is 10%, or $100, the adjustment of the base reward may be a 5% increase, in which case one or more community members that funded/provided $1,000 toward a rental agreement (e.g., a deposit) may receive $1,150 back at the end of the agreement's term (e.g., the end of the rental term).

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared, and other wireless media. Combinations of any of the above can also be included within the scope of computer-readable media.

Figure 10:
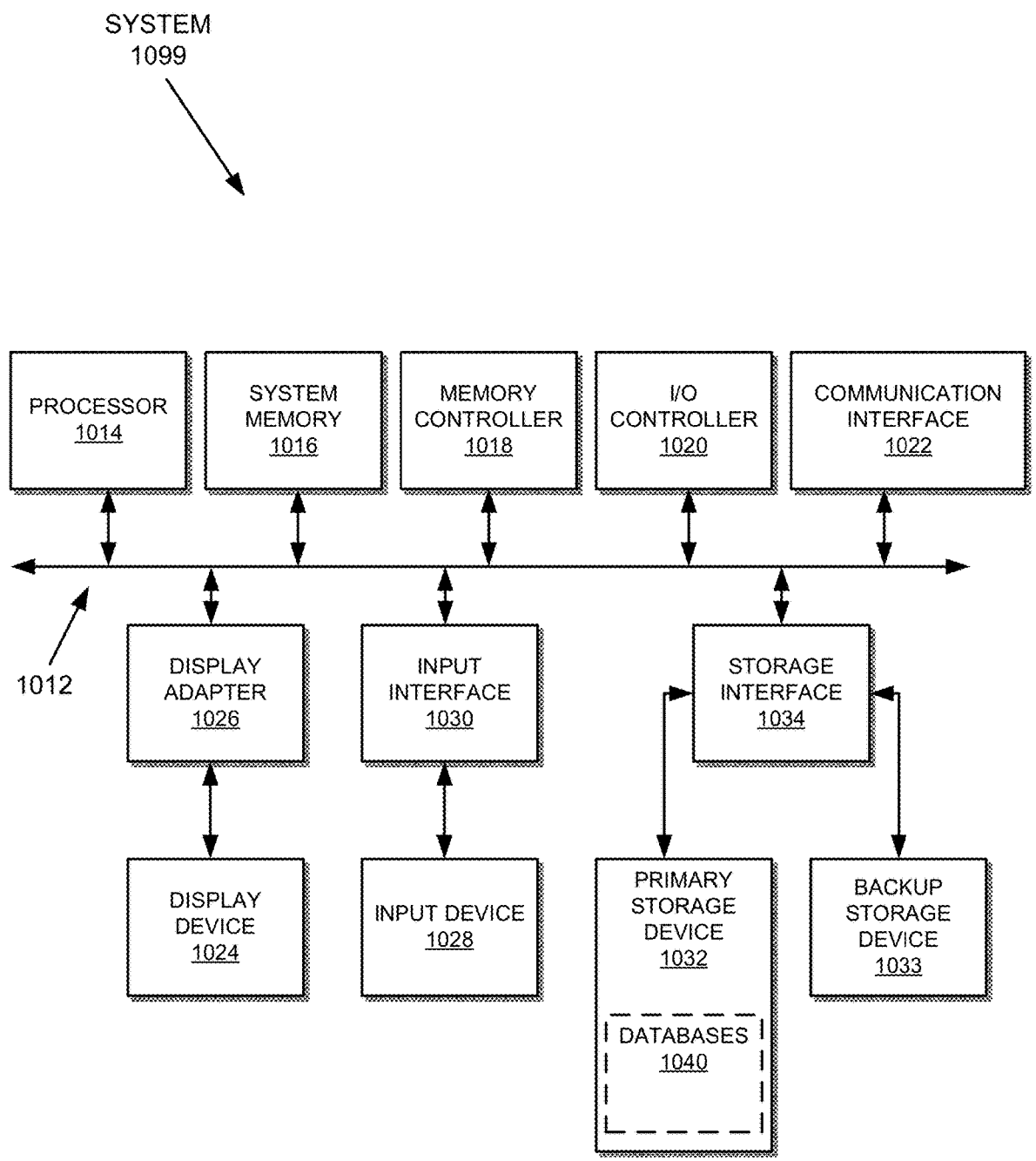
FIGS. 10 and 11 are block diagrams of exemplary computing systems, in accordance with one or more embodiments of the invention.

FIG. 10 is a block diagram of an example of a computing system 1099 capable of implementing embodiments of the present disclosure. Computing system 1099 broadly represents any single or multi-processor computing device or system capable of executing computer-readable instructions. Examples of computing system 1099 include, without limitation, workstations, laptops, client-side terminals, servers, distributed computing systems, handheld devices, or any other computing system or device. In its most basic configuration, computing system 1099 may include at least one processor 1014 and a system memory 1016.

Processor 1014 generally represents any type or form of processing unit capable of processing data or interpreting and executing instructions. In certain embodiments, processor 1014 may receive instructions from a software application or module. These instructions may cause processor 1014 to perform the functions of one or more of the example embodiments described and/or illustrated herein.

System memory 1016 generally represents any type or form of volatile or non-volatile storage device or medium capable of storing data and/or other computer-readable instructions. Examples of system memory 1016 include, without limitation, RAM, ROM, flash memory, or any other suitable memory device. Although not required, in certain embodiments computing system 1099 may include both a volatile memory unit (such as, for example, system memory 1016) and a non-volatile storage device (such as, for example, primary storage device 1032).

Computing system 1099 may also include one or more components or elements in addition to processor 1014 and system memory 1016. For example, in the embodiment of FIG. 10, computing system 1099 includes a memory controller 1018, an input/output (I/O) controller 1020, and a communication interface 1022, each of which may be interconnected via a communication infrastructure 1012. Communication infrastructure 1012 generally represents any type or form of infrastructure capable of facilitating communication between one or more components of a computing device. Examples of communication infrastructure 1012 include, without limitation, a communication bus (such as an Industry Standard Architecture (ISA), Peripheral Component Interconnect (PCI), PCI Express (PCIe), or similar bus) and a network.

Memory controller 1018 generally represents any type or form of device capable of handling memory or data or controlling communication between one or more components of computing system 1099. For example, memory controller 1018 may control communication between processor 1014, system memory 1016, and I/O controller 1020 via communication infrastructure 1012.

I/O controller 1020 generally represents any type or form of module capable of coordinating and/or controlling the input and output functions of a computing device. For example, I/O controller 1020 may control or facilitate transfer of data between one or more elements of computing system 1099, such as processor 1014, system memory 1016, communication interface 1022, display adapter 1026, input interface 1030, and storage interface 1034.

Communication interface 1022 broadly represents any type or form of communication device or adapter capable of facilitating communication between example computing system 1099 and one or more additional devices. For example, communication interface 1022 may facilitate communication between computing system 1099 and a private or public network including additional computing systems. Examples of communication interface 102 include, without limitation, a wired network interface (such as a network interface card), a wireless network interface (such as a wireless network interface card), a modem, and any other suitable interface. In one embodiment, communication interface 1022 provides a direct connection to a remote server via a direct link to a network, such as the Internet. Communication interface 1022 may also indirectly provide such a connection through any other suitable connection.

Communication interface 1022 may also represent a host adapter configured to facilitate communication between computing system 1099 and one or more additional network or storage devices via an external bus or communications channel. Examples of host adapters include, without limitation, Small Computer System Interface (SCSI) host adapters, Universal Serial Bus (USB) host adapters, IEEE (Institute of Electrical and Electronics Engineers) 1394 host adapters, Serial Advanced Technology Attachment (SATA) and External SATA (eSATA) host adapters, Advanced Technology Attachment (ATA) and Parallel ATA (PATA) host adapters, Fiber Channel interface adapters, Ethernet adapters, or the like. Communication interface 1022 may also allow computing system 1099 to engage in distributed or remote computing. For example, communication interface 1022 may receive instructions from a remote device or send instructions to a remote device for execution.

As illustrated in FIG. 10, computing system 1099 may also include at least one display device 1024 coupled to communication infrastructure 1012 via a display adapter 1026. Display device 1024 generally represents any type or form of device capable of visually displaying information forwarded by display adapter 1026. Similarly, display adapter 1026 generally represents any type or form of device configured to forward graphics, text, and other data for display on display device 1024.

As illustrated in FIG. 10, computing system 1099 may also include at least one input device 1028 coupled to communication infrastructure 1012 via an input interface 1030. Input device 1028 generally represents any type or form of input device capable of providing input, either computer- or human-generated, to computing system 1099. Examples of input device 1028 include, without limitation, a keyboard, a pointing device, a speech recognition device, or any other input device.

As illustrated in FIG. 10, computing system 1099 may also include a primary storage device 1032 and a backup storage device 1033 coupled to communication infrastructure 1012 via a storage interface 1034. Storage devices 1032 and 1033 generally represent any type or form of storage device or medium capable of storing data and/or other computer-readable instructions. For example, storage devices 1032 and 1033 may be a magnetic disk drive (e.g., a so-called hard drive), a floppy disk drive, a magnetic tape drive, an optical disk drive, a flash drive, or the like. Storage interface 1034 generally represents any type or form of interface or device for transferring data between storage devices 1032 and 1033 and other components of computing system 1099.

In one example, databases 1040 may be stored in primary storage device 1032. Databases 1040 may represent portions of a single database or computing device or it may represent multiple databases or computing devices. For example, databases 1040 may represent (be stored on) a portion of computing system 1099 and/or portions of example network architecture 1199 in FIG. 11 (below). Alternatively, databases 1040 may represent (be stored on) one or more physically separate devices capable of being accessed by a computing device, such as computing system 799 and/or portions of network architecture 1199.

Continuing with reference to FIG. 10, storage devices 1032 and 1033 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1032 and 1033 may also include other similar structures or devices for allowing computer software, data, or other computer-readable instructions to be loaded into computing system 1099. For example, storage devices 1032 and 1033 may be configured to read and write software, data, or other computer-readable information. Storage devices 1032 and 1033 may also be a part of computing system 1099 or may be separate devices accessed through other interface systems.

Many other devices or subsystems may be connected to computing system 1099. Conversely, all of the components and devices illustrated in FIG. 10 need not be present to practice the embodiments described herein. The devices and subsystems referenced above may also be interconnected in different ways from that shown in FIG. 10. Computing system 1099 may also employ any number of software, firmware, and/or hardware configurations. For example, the example embodiments disclosed herein may be encoded as a computer program (also referred to as computer software, software applications, computer-readable instructions, or computer control logic) on a computer-readable medium.

The computer-readable medium containing the computer program may be loaded into computing system 1099. All or a portion of the computer program stored on the computer-readable medium may then be stored in system memory 1016 and/or various portions of storage devices 1032 and 1033. When executed by processor 1014, a computer program loaded into computing system 1099 may cause processor 1014 to perform and/or be a means for performing the functions of the example embodiments described and/or illustrated herein. Additionally or alternatively, the example embodiments described and/or illustrated herein may be implemented in firmware and/or hardware.

For example, a computer program for requesting advertising content for display by a thin client application may be stored on the computer-readable medium and then stored in system memory 716 and/or various portions of storage devices 1032 and 1033. When executed by the processor 1014, the computer program may cause the processor 1014 to perform and/or be a means for performing the functions required for carrying out the process described with regard to the flowcharts of FIGS. 9A-9C (discussed above).

Figure 11:
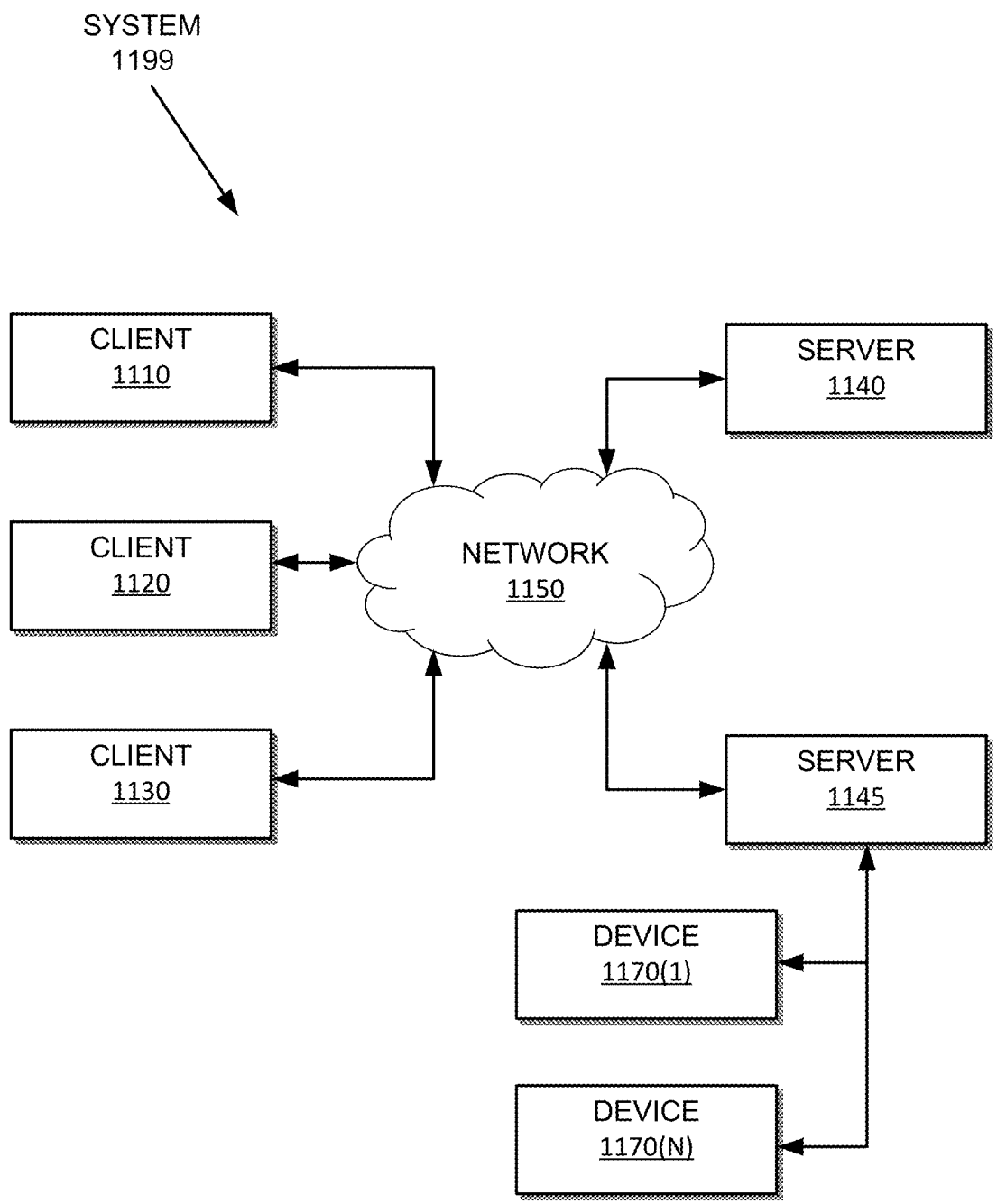

FIG. 11 is a block diagram of an example of a network architecture 1199 in which client systems 1110, 1120, and 1130 and servers 1140 and 1145 may be coupled to a network 1150. Client systems 1110, 1120, and 1130 generally represent any type or form of computing device or system, such as devices 102, 104, 106, 108, 110, and 112 of FIG. 1.

Similarly, servers 1140 and 1145 generally represent computing devices or systems, such as application servers or database servers, configured to provide various database services and/or run certain software applications (e.g., functionality of data repository 120 of FIG. 1). Network 1150 generally represents any telecommunication or computer network including, for example, an intranet, a wide area network (WAN), a local area network (LAN), a personal area network (PAN), or the Internet.

With reference to computing system 1199 of FIG. 11, a communication interface, such as communication interface 1122, may be used to provide connectivity between each client system 1110, 1120, and 1130 and network 1150. Client systems 1110, 1120, and 1130 may be able to access information on server 1140 or 1145 using, for example, a Web browser, thin client application, or other client software. Such software may allow client systems 1110, 1120, and 1130 to access data hosted by server 1140, server 1145, or storage devices 1170(1)-(N). Although FIG. 11 depicts the use of a network (such as the Internet) for exchanging data, the embodiments described herein are not limited to the Internet or any particular network-based environment.

In one embodiment, all or a portion of one or more of the example embodiments disclosed herein are encoded as a computer program and loaded onto and executed by server 1140, server 1145, storage devices 1170(1)-(N), or any combination thereof. All or a portion of one or more of the example embodiments disclosed herein may also be encoded as a computer program, stored in server 840, run by server 845, and distributed to client systems 810, 820, and 830 over network 850.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present disclosure has been described in particular embodiments, it should be appreciated that the invention should not be construed as limited by such embodiments, but rather construed according to the below claims.

What is claimed is:

1. A method for crowdsourcing via cryptographically linked blockchains, the method comprising:
    receiving tenant information about a first tenant comprising a tenant quality score, and at least partially storing the tenant information on one or more cryptographically linked blockchains;
    receiving rental property information about a rental property and landlord information about a landlord, wherein the rental property information includes landlord information and the landlord information includes the rental property information, and at least partially storing the rental property information and the landlord information on the one or more cryptographically linked blockchains;
    receiving community member information about a community member, and at least partially storing the community member information on the one or more cryptographically linked blockchains;
    receiving, from the first tenant, a first application to rent the rental property, and at least partially storing the first application on the one or more cryptographically linked blockchains;
    providing, at least a portion of the tenant information stored on the one or more cryptographically linked blockchains, to the community member;
    receiving a funding application tied to a cryptographic smart contract from the community member for providing funding for a security deposit towards the rental property;
    providing the funding application to the first tenant;
    receiving acceptance of the funding application from the first tenant;
    identifying, after receiving acceptance of the funding application, a blockchain transaction indicating that a security deposit for the rental property was at least partially returned by the landlord, wherein the cryptographic smart contract is executed, based at least on the blockchain transaction, to programmatically release a reward to the community member for providing funding for the security deposit; and
    adjusting the tenant quality score in response to the indication that the security deposit for the rental property was at least partially returned by the landlord.

2. The method of claim 1, wherein the first application includes at least one term selected from the group consisting of: a rent offer, a security deposit offer, and a credit score.

3. The method of claim 1, wherein the method further comprises:
    receiving a second application from a second tenant to rent the rental property, wherein the first application includes terms more preferable to terms included in the second application.

4. The method of claim 3, wherein the method further comprises:
    receiving a third application, wherein the third application includes terms more preferable to the terms included in the second application.

5. The method of claim 4, wherein the third application is received from the first tenant, and wherein the third application further comprises a modification to a rent offer or a modification to an offer for the security deposit.

6. The method of claim 1, wherein the tenant information, rental property information, and landlord information stored on the one or more cryptographically linked blockchains are accessible to community members.

7. The method of claim 1, wherein the first application stored on the one or more cryptographically linked blockchains is accessible to prospective tenants.

8. The method of claim 1, further comprising:
    in response to receiving acceptance of the funding application from the first tenant, creating the cryptographic smart contract, wherein the cryptographic smart contract comprises the tenant information and the rental property information; and
    storing the cryptographic smart contract on the one or more cryptographically linked blockchains.

9. The method of claim 1, wherein the first application includes a security deposit amount term less than an amount of the security deposit for the rental property, and the funding application includes a remainder amount of the security deposit for the rental property.

10. The method of claim 1, further comprising:
    receiving tokens as funding, wherein the tokens are associated with the one or more blockchains.

11. The method of claim 1, further comprising:
    determining that the security deposit for the rental property was not completely returned, wherein adjusting the tenant quality score comprises reducing the tenant quality score.

12. The method of claim 1,
    wherein the reward is a percentage of an amount of funding deposited by the community member, and wherein the method further comprises:
    adjusting an amount of the reward based on the tenant quality score, wherein adjusting the tenant quality score is based at least in part on whether the security deposit for the rental property was not completely returned.

13. A system for crowdsourcing via cryptographically linked blockchains, the system comprising:
    a computer processor;
    a memory; and a crowdsourced rental network engine executing on the computer processor and configured to:

receive tenant information about a first tenant comprising a tenant quality score, and at least partially store the tenant information on one or more cryptographically linked blockchains;

receive rental property information about a rental property and landlord information about a landlord, wherein the rental property information includes landlord information and the landlord information includes the rental property information, and at least partially store the rental property information and the landlord information on the one or more cryptographically linked blockchains;

receive community member information about a community member, and at least partially store the community member information on the one or more cryptographically linked blockchains;

receive, from the first tenant, a first application to rent the rental property, and at least partially store the first application on the one or more cryptographically linked blockchains;

provide, at least a portion of the tenant information stored on the one or more cryptographically linked blockchains, to the community member;

receive a funding application tied to a cryptographic smart contract from the community member for providing funding for a security deposit towards the rental property;

provide the funding application to the first tenant;

receive acceptance of the funding application from the first tenant;

identify, after receiving acceptance of the funding application, a blockchain transaction indicating that a security deposit for the rental property was at least partially returned by the landlord, wherein the cryptographic smart contract is executed, based at least on the blockchain transaction, to programmatically release a reward to the community member for providing funding for the security deposit; and adjust the tenant quality score in response to the indication that the security deposit for the rental property was at least partially returned by the landlord.

14. The system of claim 13, wherein the first application includes at least one term selected from the group consisting of: a rent offer, a security deposit offer, and a credit score.

15. The system of claim 13, wherein the crowdsourced rental deposit network engine executing on the computer processor is further configured to:

receive a second application from a second tenant to rent the rental property, wherein the first application includes terms more preferable to terms included in the second application.

16. The system of claim 15, wherein the crowdsourced rental deposit network engine executing on the computer processor is further configured to:

receive a third application from the first tenant to rent the rental property, wherein the third application includes terms more preferable to the terms included in the second application.

17. A non-transitory computer-readable storage medium comprising a plurality of instructions for crowdsourcing via cryptographically linked blockchains, the instructions configured to execute on at least one computer processor to enable the computer processor to:

receive tenant information about a first tenant comprising a tenant quality score, and at least partially store the tenant information on one or more cryptographically linked blockchains;

receive rental property information about a rental property and landlord information about a landlord, wherein the rental property information includes landlord information and the landlord information includes the rental property information, and at least partially store the rental property information and the landlord information on the one or more cryptographically linked blockchains;

receive community member information about a community member, and at least partially store the community member information on the one or more cryptographically linked blockchains;

receive, from the first tenant, a first application to rent the rental property, and at least partially store the first application on the one or more cryptographically linked blockchains;

provide, at least a portion of the tenant information stored on the one or more cryptographically linked blockchains, to the community member;

receive a funding application tied to a cryptographic smart contract from the community member for providing funding for a security deposit towards the rental property;

provide the funding application to the first tenant;

receive acceptance of the funding application from the first tenant;

identify, after receiving acceptance of the funding application, a blockchain transaction indicating that a security deposit for the rental property was at least partially returned by the landlord, wherein the cryptographic smart contract is executed, based at least on the blockchain transaction, to programmatically release a reward to the community member for providing funding for the security deposit; and adjust the tenant quality score in response to the indication that the security deposit for the rental property was at least partially returned by the landlord.

18. The non-transitory computer-readable storage medium of claim 17, wherein the first application includes at least one term selected from the group consisting of: a rent offer, a security deposit offer, and a credit score.

19. The non-transitory computer-readable storage medium of claim 18, wherein the instructions configured to execute on the at least one computer processor further enable the computer processor to:

receive a second application from a second tenant to rent the rental property, wherein the first application includes terms more preferable to terms included in the second application.

20. The non-transitory computer-readable storage medium of claim 19, wherein the instructions configured to execute on the at least one computer processor further enable the computer processor to:

receive a third application from the first tenant to rent the rental property, wherein the third application includes terms more preferable to the terms included in the second application.

* * * * *